United States Patent

Stewart et al.

[19]

[11] Patent Number: 5,812,310
[45] Date of Patent: Sep. 22, 1998

[54] ORTHOGONAL HIGH ACCURACY MICROSCOPE STAGE

[75] Inventors: John P. Stewart, Seattle; Thurmond R. Smith, Bellingham; Gary M. Gunderson, Issaquah, all of Wash.

[73] Assignee: Applied Precision, Inc., Mercer Island, Wash.

[21] Appl. No.: 732,161

[22] Filed: Oct. 16, 1996

[51] Int. Cl.[6] .............................. G02B 21/26; B23Q 1/28
[52] U.S. Cl. .......................... 359/392; 359/393; 108/137; 269/71; 269/73
[58] Field of Search .................................... 359/392, 393, 359/394; 108/20, 137; 269/71, 73

[56] References Cited

U.S. PATENT DOCUMENTS

| | | | |
|---|---|---|---|
| 4,193,317 | 3/1980 | Oono et al. | 108/20 |
| 4,234,175 | 11/1980 | Sato et al. | 369/73 |
| 4,422,002 | 12/1983 | Binnig et al. | 310/328 |
| 4,948,330 | 8/1990 | Nomura et al. | 359/393 |
| 5,022,619 | 6/1991 | Mamada | 269/73 |
| 5,524,502 | 6/1996 | Osanai | 108/20 |

FOREIGN PATENT DOCUMENTS

| | | | |
|---|---|---|---|
| 2-218110 | 8/1990 | Japan | 359/391 |

OTHER PUBLICATIONS

"XYZ Travelling Support", IBM Tech. Dis. Bulletin, vol. 29, No. 8, p.3526 (359/393), Jan. 1987.

Applied Precision, Inc., Z–Axis Stage for the PRVX, Sold Jul. 6, 1995.

*Primary Examiner*—Jon W. Henry
*Attorney, Agent, or Firm*—Richardson & Folise

[57] ABSTRACT

A high accuracy, orthogonal motion stage for microscopes and the like uses three frames for orthogonal motion. The lower most frame has provided thereon a series of downwardly depending ramps. An actuator plate having correspondingly positioned, upwardly directed ramps is translated with respect to the lower most frame to raise and lower the frames.

11 Claims, 5 Drawing Sheets

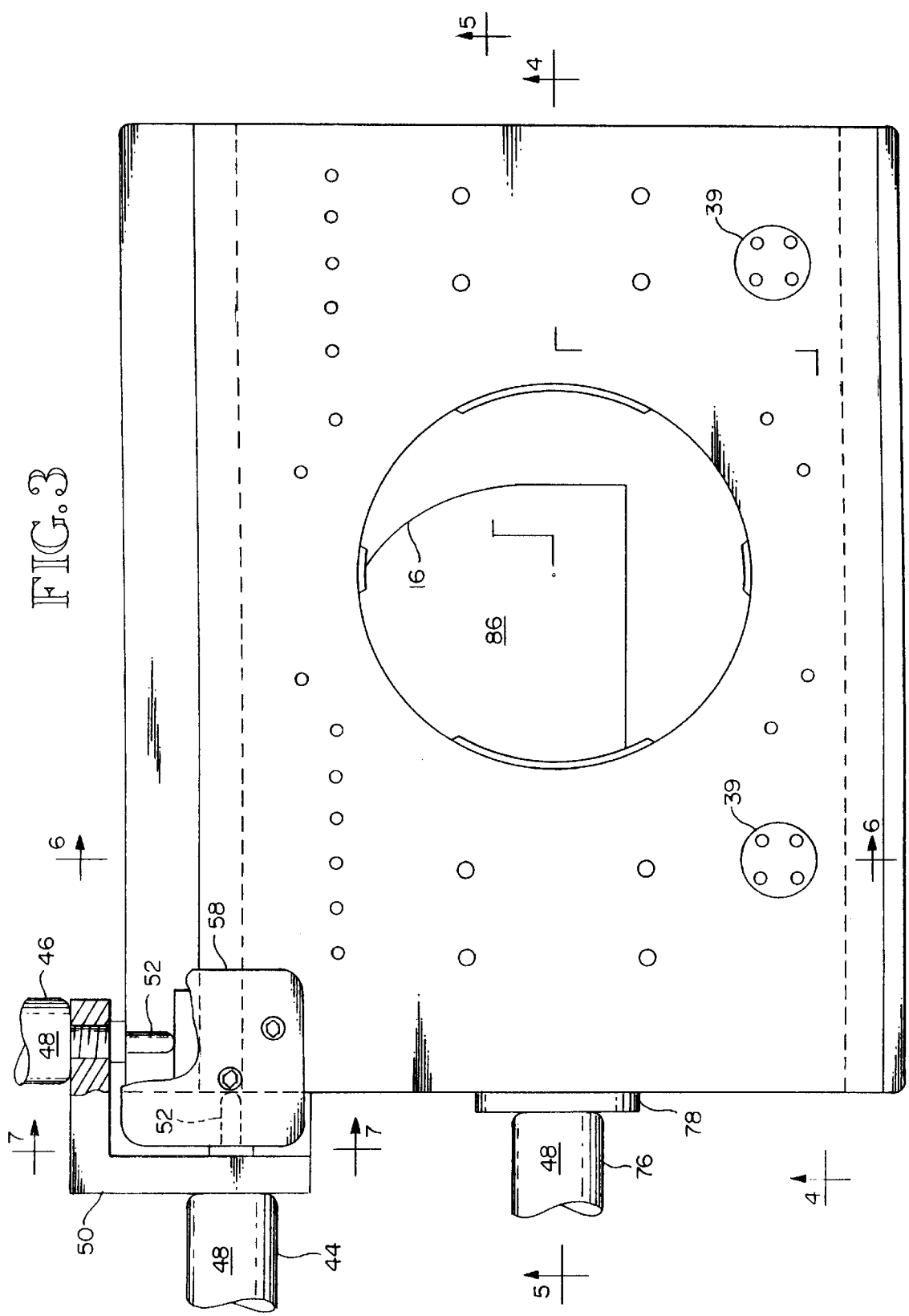

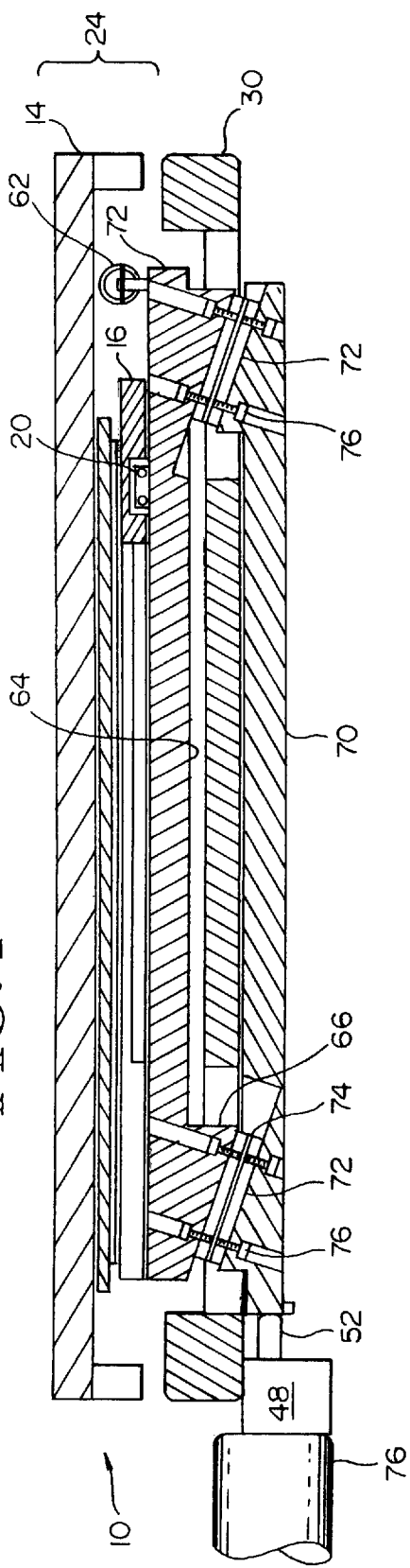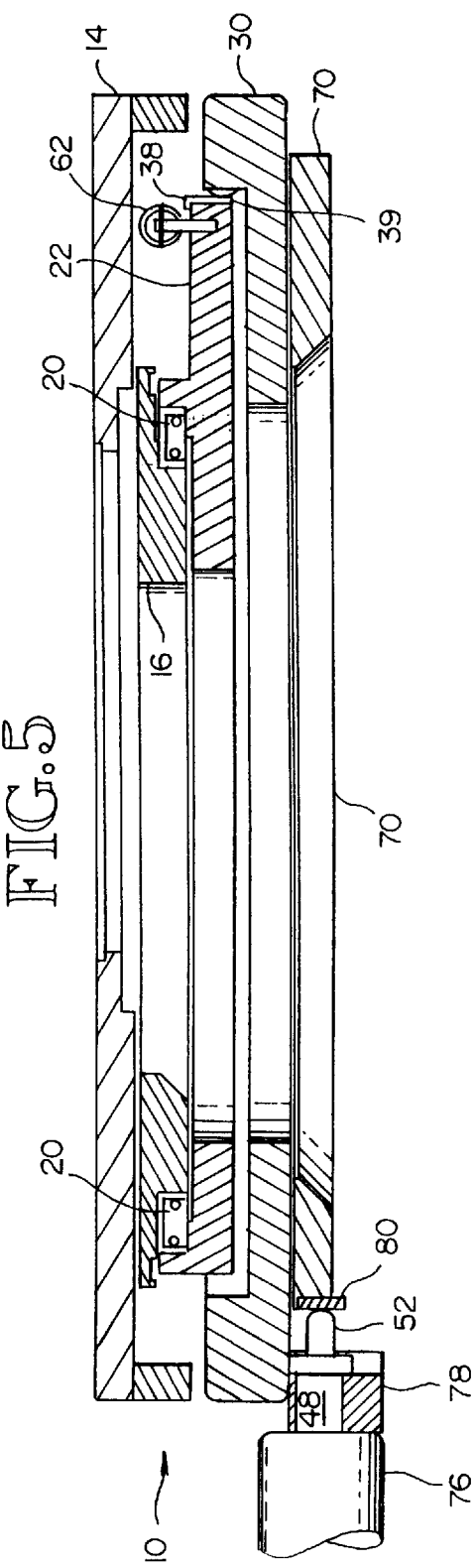

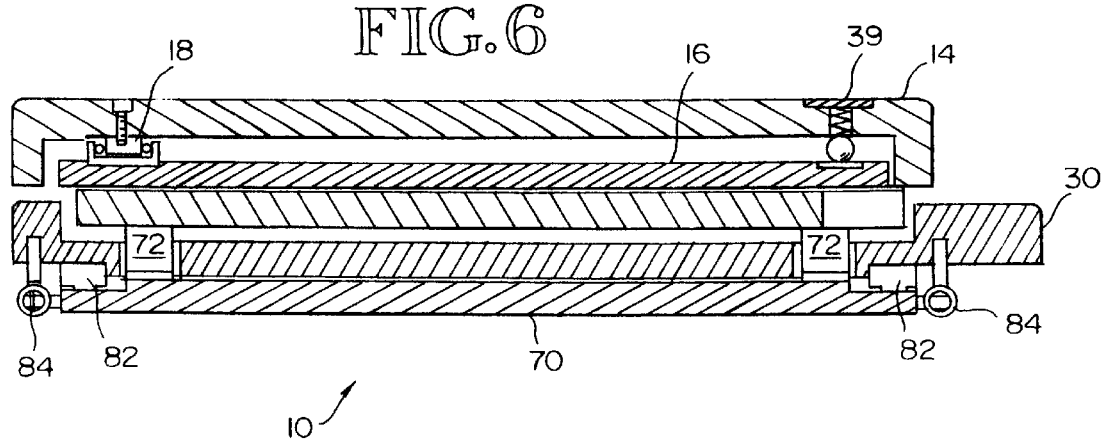
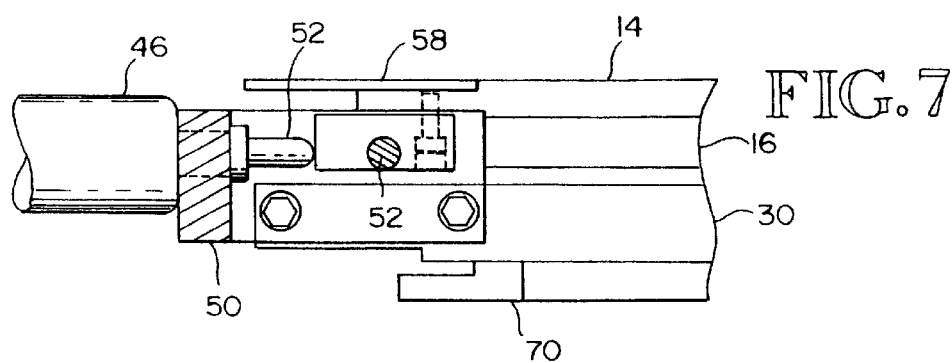

ORTHOGONAL HIGH ACCURACY MICROSCOPE STAGE

TECHNICAL FIELD

The invention relates to orthogonal motion stages. More specifically, the invention relates to independent X-, Y-, and Z-axis stages for optical microscopes.

BACKGROUND OF THE INVENTION

Conventional confocal microscopes employ small aperture objective lenses to improve depth of field at high magnifications. As a result, confocal microscopes require high intensity light sources to provide sufficient specimen illumination for viewing or electronic imaging. Inorganic and some organic specimens can generally tolerate exposure to such high intensity light sources. However, many organic and most active biological samples cannot tolerate prolonged exposure to high intensity light sources. For this reason, modern researchers, particularly in the biotechnology field, have welcomed the introduction of wide field, optical sectioning microscopes employing wide aperture lenses. Due to the greater light gathering ability of these optics, active biological samples can be viewed for prolonged periods. In some systems, such as those offered for sale by the assignee of the present invention under the brand name DeltaVision™, it is now possible to collect optical information from wide field optics electronically, such as in a charged coupled device array, to digitize and integrate that information over time, and to provide a computer generated three dimensional image of the sample. Such measurement techniques are particularly valuable in the field of florescence microscopy where images of the specimen are not only integrated over time, but wavelength as well.

Due to the unique nature of wide field microscopy, precise movement of the specimen along the optical axis, as well as in a plane perpendicular to the optical axis (hereinafter "reference plane") is critical for the development of an accurate three dimensional image of the sample. The ability to move the sample in the reference plane, without inducing undesired motion along the optical axis is of special importance to maintain the sample in focus, as well as for the development of an accurate three dimensional representation.

Historically, confocal microscopes have not been burdened with the challenges of developing a three dimensional image of the specimen. Thus, movement of the specimen in the X and Y direction (i.e., the reference plane) does not present a problem even if undesirable and motion in the Z-axis (i.e., the optical axis) is induced. The microscope operator merely refocuses the image. Thus, microscope stages employing confocal technology typically employ independent frames or carriers which are moveable in the X-, Y- and Z-axis directions by manually operated, micrometer type devices. Such devices are not suitable for adaptation to computer control where a pre-established scanning pattern is imposed on the specimen to develop the desired three dimensional image.

Conventional microscope stages use conventional X-, Y-, and Z-axis stages such as the stage disclosed in U.S. Pat. No. 4,711,537 to Schindl et al. which are manually adjusted by micronometer screws. Such stages tend to impart unwanted motion in directions orthogonal to their primary direction of motion through an adjacent interconnect stage. Thus, microscope stages of this type are insufficiently accurate for the purposes described above. Automated microscope stages such as the type disclosed in U.S. Pat. No. 4,367,915 to Georges provide automated, remote control actuation to the individual stages, but fail to incorporate any means for compensating for backlash in the screw actuated drive trains thus providing a system with insufficient accuracy for the above-described purpose. The assignee of the present invention has filed U.S. patent application Ser. No. 08/389,154 titled "ORTHOGONAL MOTION MICROSCOPE STAGE" on Feb. 15, 1995. The disclosure of said application is incorporated herein by reference. That application discloses an orthogonal motion microscope stage which does not transfer secondary motion of X-axis and Y-axis frames to a specimen carrier in the Z-axis direction because the specimen carrier is directly connected to a Z-axis stage. Straightline motion of the Z-axis stage is assured by the use of a multilink arm system of the Scott-Russel type. Although such stage may provide sufficient accuracy for the purposes described above, the stage is complex to manufacture. Finally, the assignee of the present invention has previously sold a wedge-type mechanism for providing stage motion in a vertical direction for its Precision Point™ probe card rework stations. However, this mechanism does not provide sufficient accuracy for the purposes described herein.

A need therefore exists for an orthogonal motion microscope stage which is capable of moving a specimen in the X-Y reference plane and Z-axis optical direction with high accuracy. The motion of the stage carriers or frames is preferably automatic and adapted to computer control.

SUMMARY OF THE INVENTION

The invention achieves the above object, and other objects and advantages which will become apparent from the description which follows, by providing a wedge driven orthogonal motion stage for microscopes and the like. The stage has a horizontal motion assembly defined by first and second carriers, or frames, which are slidably connected to a third carrier or frame so as to define a reference plane. A base member or plate restrains the third carrier against motion in the horizontal plane, but permits motion in a vertical direction. A mechanism is provided for raising the third carrier, and thus the horizontal motion assembly as well in the vertical direction.

In a preferred embodiment, the mechanism for raising and lowering the third carrier consists of an actuator plate having a plurality of ramps, wedges or the like, which mate with corresponding wedges or ramps on the underside of the third carrier or frame. Lateral motion of the actuator member in the direction of a slope of the ramps causes the third carrier to rise or lower due to camming action at the interface of the ramps.

BRIEF DESCRIPTION OF THE DRAWINGS

FIG. 3 is a top plan view of the orthogonal motion stage.

FIG. 4 is a sectional, elevational view taken along line 4—4 of FIG. 3.

FIG. 5 is a sectional, elevational view taken along line 5—5 of FIG. 3.

FIG. 6 is a sectional, elevational view taken along line 6—6 of FIG. 3.

FIG. 7 is a partial, sectional elevational view taken along line 7—7 of FIG. 3.

DETAILED DESCRIPTION OF THE PREFERRED EMBODIMENTS

Figure 1:
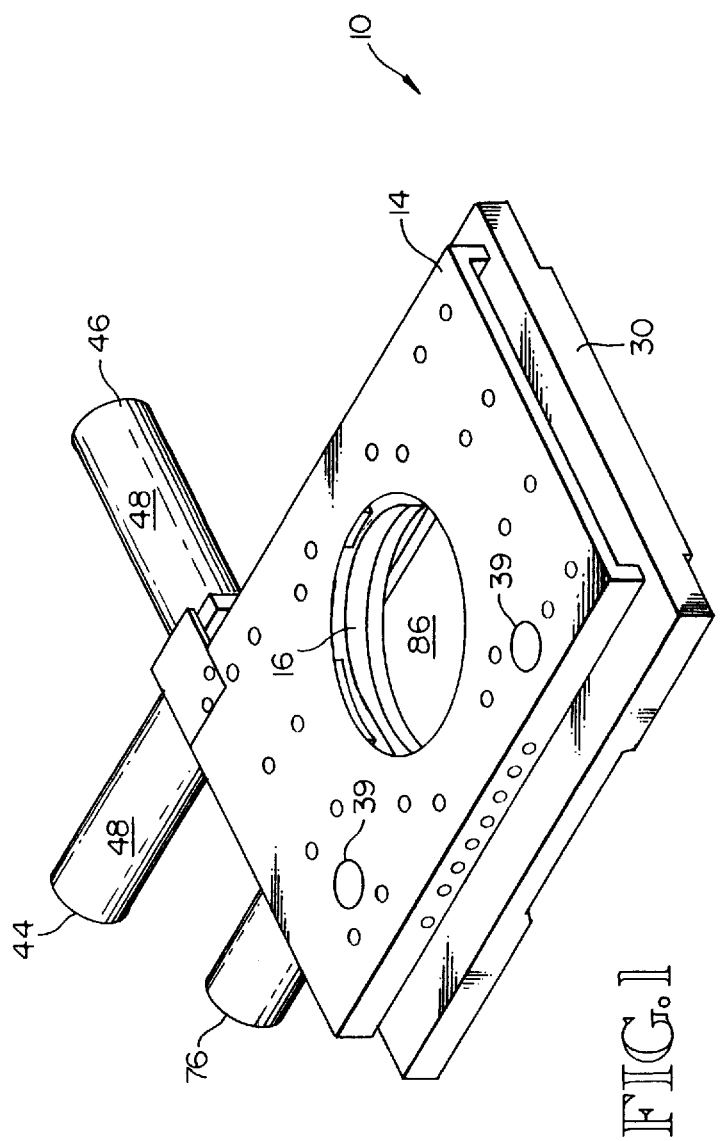
FIG. 1 is an isometric, environmental view of an orthogonal motion microscope stage in accordance with the general principals of the invention.

An orthogonal motion microscope stage, in accordance with the principals of the invention is generally indicated at reference numeral 10 in the Figures. The stage is well adapted for use with wide field, optical sectioning microscopes employing wide aperture lenses, such as those described in co-pending United States Patent Application Ser. No. 08/389,154 titled "ORTHOGONAL MOTION MICROSCOPE STAGE", the disclosure of which is incorporated herein by reference.

Figure 2:
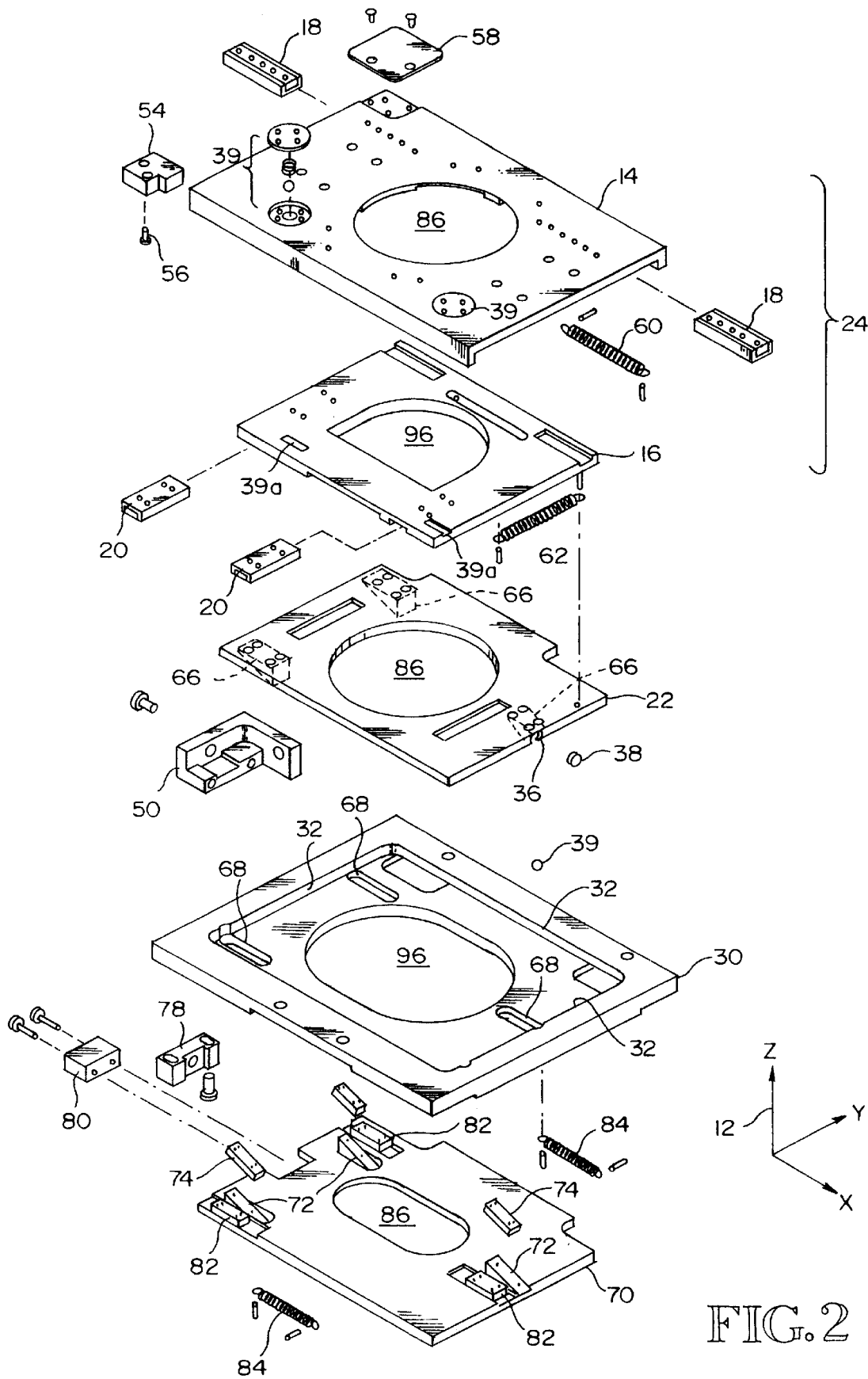
FIG. 2 is an exploded, isometric view of the orthogonal motion stage of FIG. 1.

As best seen in FIG. 2 the stage 10 has various carriers or frames adapted for orthogonal motion as indicated by reference frame 12. The stage 10 consists of an X-axis frame 14 which is slidably connected to a Y-axis frame 16 by two sets of linear slides 18 aligned in the X-axis direction to provide respective linear motion of the two frames in said X-axis direction. Placement of the linear slides is critical in that they must be positioned to properly support the X-axis frame to cause minimal deflection during Z-axis movement thus minimizing cross-coupling movement in the X- or Y-axis direction. At two locations on the X-axis frame 14 a ball bearing and spring assembly 39 are held in position by a cover to exercise loading between X-axis and Y-axis frames to minimize X-axis flutter. The ball bearings ride on turcite plastic inserts 39a available from W.S. Shamban & Co., Ft. Wayne, Ind., U.S.A. Appropriate slides are available from Schneeburger, Inc., 7 De Angelo, Bedford, Mass., U.S.A., 01730. An orthogonal set of slides 20 identical to the first slide set interconnect the Y-axis frame 16 with a Z-axis frame 22. The second set of linear slides 20 are aligned in the direction of the Y-axis so as to provide relative linear sliding motion between the Y-axis frame 16 and the Z-axis frame 22. The X-axis frame 14, Y-axis frame 16, and the linear slide sets 18, 20 thereby form a horizontal motion assembly generally indicated at reference numeral 24 capable of moving in a reference frame defined by the X- and Y-axes.

The Z-axis frame 22 is received in a base member or base plate 30 which is adapted for connection to a microscope (not shown). The base plate has side walls 32 which closely receive peripheral edges 34 of the Z-axis frame 22. In this respect, one peripheral edge 34 of the Z-axis frame 22 is provided with a receptacle 36 for a Valenite insert 38 to act as a bearing surface for a ball bearing 39 which is received in a semi-cylindrical depression 40 in a sidewall base plate 30. The Z-axis frame is therefore restrained against motion in the X-axis and Y-axis directions, but is free to travel over a limited distance in the direction of the Z-axis.

In order to move the X- and Y-axis frames 14, 16 in their respective directions, linear actuators 44, 46, best seen in FIGS. 1, 3 and 7 are provided. Appropriate actuators are available from Applied Precision, Inc., Mercer Island, Wash., U.S.A. under the trademark NANOMOVER™. These NANOMOVER™ brand micro-positioning devices have onboard circuitry enabling computer control of the actuators by way of conventional personal computer software interfaces which are commercially available. Each linear actuator has a main body 48 which is connected to an L-shaped bracket 50. The bracket is secured to the base plate 30 by conventional means such as screws or bolts or as part of a casting. Each linear actuator has a reciprocatable piston 52 extending therefrom which reacts against a steel block 54 connected to the X-axis frame 14 by screws, such as screw 56. The steel block has polished sidewalls allowing free ends of the pistons to slide vertically and horizontally with respect to the block sidewalls. Threaded apertures in the X-axis frame 14 for receiving the screws are countersunk and covered by a plate 58. Each of the linear actuators 44, 46 are counterloaded by X-axis and Y-axis tension springs 60, 62, respectively, causing each frame to coordinate its motion with retraction of the pistons 52. To this purpose, one end of the X-axis spring 60 is connected to the X-axis frame, while the remaining end is connected to the Y-axis frame 16. Similarly, one end of the Y-axis spring 62 is connected to the Y-axis frame 16, while the remaining end is connected to the Z-axis frame 22. In this fashion, the X- and Y-axis frames move in their respective directions under computer control through linear actuators 44, 46.

In order to impart vertical motion along the Z-axis to the horizontal motion assembly 24, an underside 64 of the Z-axis frame 22 is preferably provided with at least three downwardly depending extensions 66 providing a ramp like or cam surface forming an angle of approximately 18.5 degrees with respect to the reference plane defined by the X- and Y-axes shown at reference numeral 12 in FIG. 2. The base plate 30 is provided with three oblong apertures 68 sized and positioned to permit the extension 66 to pass therethrough. Placement of the downwardly depending extensions must equalize, or nearly equalize Z-axis forces to minimize Z-axis skew.

An actuator plate 70 is provided with three cooperating, upwardly directed protrusions having complementary angles with respect to the herein before defined reference plane to correspond with the extensions 66 in the Z-axis frame 22. Both the extensions 66 and the protrusions 72 are adapted to receive linear slides 74. Appropriate linear slides are available from Schneeburger, Inc., 7 De Angelo, Bedford, Mass., U.S.A., 01730. The linear slides 74 are secured to the extensions, and protrusions by appropriate screws 76. In the preferred embodiment shown in the figures, the slopes of the camming surface defined by the extensions 66 and protrusions 72 are directed along the X-axis. As will be apparent to those of ordinary skill in the relevant art, translation of the actuator plate 70 in the X-axis direction will either raise or lower the Z-axis frame 22, and thereby the horizontal motion assembly 24 in a ratio of 3: 1.

In a fashion similar to that described for the X- and Y-axis motion of the X- and Y-axis frames 14, 16 the actuator plate 70 is provided with a linear actuator 76 which is connected to the actuator plate by a bracket 78. A piston portion 52 of the linear actuator reacts directly against a ball bearing (not shown) mounted in a block 80 of the actuator plate 70. The actuator plate 70 and base plate 30 are provided with a duplicate set of horizontal linear slides 82 therebetween for relative slidability of the actuator and base plates with respect to one another in the horizontal reference plane. A pair of reaction tensions springs 84 are interconnected between the base plate 30 and actuator plate 70 so that the actuator plate can follow the motion of the piston 52 of the linear actuator 76 when the piston is retracted to lower the horizontal motion assembly 24.

As is well understood by those of ordinary skill in the art, each of the stages 14, 16, 22, the base plate 30, and the actuator plate 70 define centrally located apertures 86 to provide an optical pathway for the microscope option (not shown).

As will also be apparent to those of ordinary skill in the art, other embodiments and variations are contemplated within the spirit of the above disclosure. Therefore, the invention is not to be limited by the above disclosure, but is to be determined in scope by the claims which follow.

We claim:

1. An orthogonal motion stage, comprising:

first and second carriers slidably interconnected for relative motion in a first direction and defining a horizontal motion assembly;

a third carrier slidably connected to the horizontal motion assembly for linear motion in a second direction orthogonal to the first direction so as to define a reference plane, the third carrier having a plurality of downwardly directed camming surfaces;

an actuator member having a plurality of cooperatively positioned, upwardly directed camming surfaces slidably engaged with the downwardly directed camming surfaces for imparting vertical motion to the horizontal motion assembly in a third orthogonal direction;

a base member slidably connected to the actuator member and having means for fixing the relative horizontal position of the third carrier with respect to the base member, the base member being interpositioned between the third carrier and the actuator member and defining apertures for passage therethrough of the camming surfaces; and, an actuator interconnected between the base and actuator members for sliding the actuator member with respect to the base member so as to causes a proportional vertical displacement of the third carrier and the horizontal motion assembly in the third orthogonal direction.

2. The stage of claim 1, including moving means for moving the first, and second carriers in their respective directions, whereby motion of the first and second carriers in the first and second directions does not induce undesirable motion of the horizontal motion assembly in the third direction.

3. The stage of claim 1, wherein the camming surfaces are three wedges having a predetermined slope.

4. The stage of claim 3, wherein the predetermined slope is approximately 18.5 degrees.

5. The stage of claim 3, wherein the base member and third carrier have a low friction bearing therebetween for relative motion in the third direction.

6. An orthogonal motion stage, comprising:

X- and Y-axis frames slidably interconnected for relative motion in an X-axis direction and defining an X-Y assembly;

a Z-axis frame slidably connected to the X-Y assembly for linear motion in a Y-axis direction orthogonal to the X-axis direction so as to define a reference plane;

an actuator plate having a plurality of cooperatively positioned, upwardly directed camming surfaces slidably engaged with the downwardly directed camming surfaces for imparting vertical motion to the horizontal motion assembly in a Z-axis direction;

a base plate slidably connected to the actuator plate and having means for receiving the Z-axis frame and fixing the relative horizontal position of the Z-axis frame with respect to the base plate, the base plate being interpositioned between the Z-axis frame and the actuator plate and defining apertures for passage therethrough of the camming surfaces; and, an actuator interconnected between the base and actuator plates for sliding the base and actuator plates with respect to one another so as to causes a proportional vertical displacement of the Z-axis frame and the horizontal motion assembly in the Z-axis direction.

7. The stage of claim 6, including moving means for moving the X-, and Y-axis frames in their respective directions, whereby motion of the X- and Y-axis carriers in the X- and Y-axis directions does not induce undesirable motion of the horizontal motion assembly in the Z-axis direction.

8. The stage of claim 6, wherein the camming surfaces are three wedges having a predetermined slope.

9. The stage of claim 8, wherein the predetermined slope is approximately 18.5 degrees.

10. The stage of claim 6, wherein the base member and Z-axis frame have a low friction bearing therebetween for relative motion in the Z-axis direction.

11. A method for interconnecting X-, Y- and Z-axis carriers for orthogonal motion in a microscope a stage, comprising the steps of:

slidably interconnecting X-, Y- and Z-axis carriers for relative translational motion in X-axis and Y-axis directions so as to define an X-Y assembly;

providing the Z-axis carrier with at least three wedge shaped downwardly directed camming surfaces;

receiving the Z-axis carrier in a base member and fixing the Z-axis carrier against horizontal movement with respect to the base member; and, moving three corresponding camming surfaces against the three wedge shaped downwardly directed camming surfaces to move the Z-axis carrier in a vertical direction.

* * * * *